Nov. 12, 1929. G. R. LUGINBUHL Re. 17,486

RAILWAY GUIDE

Original Filed May 22, 1925

Inventor:
G. R. Luginbuhl,
by Langner, Parry, Card and Langner
Attys.

Reissued Nov. 12, 1929

Re. 17,486

UNITED STATES PATENT OFFICE

GODEFROY RODOLPHE LUGINBUHL, OF LAUSANNE, SWITZERLAND

RAILWAY GUIDE

Original No. 1,642,616, dated September 13, 1927, Serial No. 32,135, filed May 22, 1925, and in Switzerland May 26, 1924. Application for reissue filed September 6, 1929. Serial No. 390,798.

This invention relates in its specific adaptation as herein shown, to a railway-guide provided with a diagrammatic table or index showing the various lines of railway communication, each line on the diagram leading to a particular station, designated by its name, and branching off from at least one station which is taken as the head station, the end of each branching or radiating line pointing towards the page of the railway-guide upon which is the time-table desired.

One of the objects of the invention is to provide a book or other stack of pages or leaves, of which the railway-guide is an example, with different sections devoted to printed or other visually presented subject-matters, said book having an orientizing index page on which, near the surrounding edges thereof are inscribed symbols designating or otherwise identifying the corresponding subject matters to which the sections of the book or stack of leaves refer.

Another object of the invention is the provision of an interior double orientizing page, as above described, in combination with a master notch, cut through the outside page or cover and extending depthwise as far as the orientizing index page whereby the index page may be instantly found without any preliminary opening of the cover or turning of leaves and whereby the facility of finding the index is not impaired by the accidental tearing off of the cover or the loss of one or more of the pages of the book anterior to the index page.

In order that the invention may be fully understood and readily carried out, one form of the railway-guide according to the invention is described hereinafter, by way of example, and illustrated in the accompanying drawing.

Figure 1:
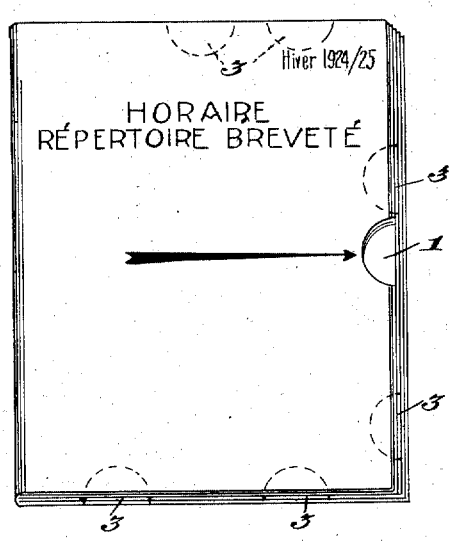
Figure 1 shows the railway-guide closed.
Figure 2:
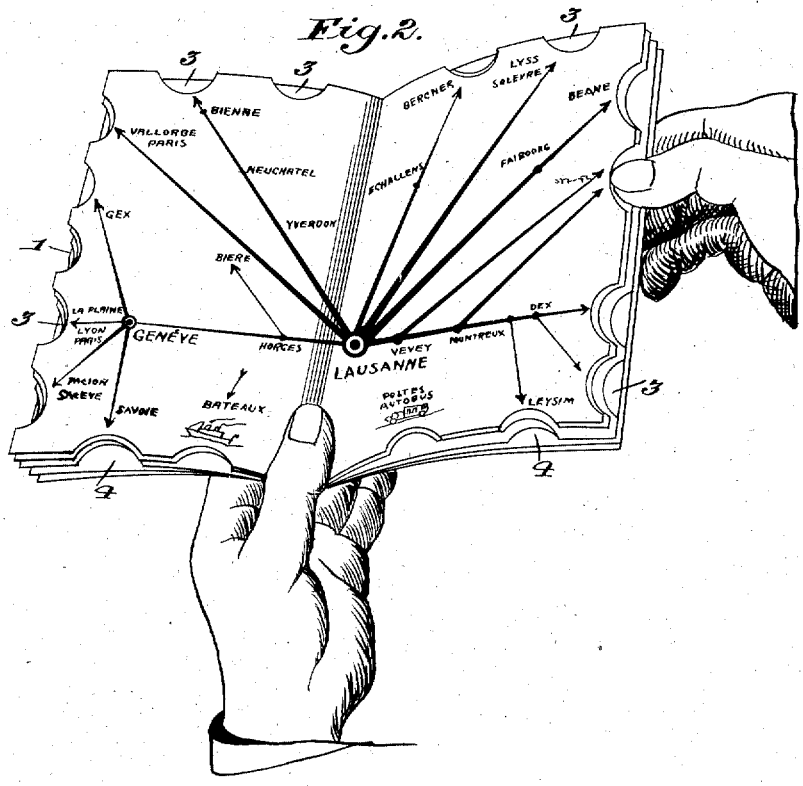
Figure 2 shows it open at the page of the directing table or index.

In the form of construction shown in the drawing the railway-guide is preferably constructed in book or pamphlet form and is provided with a master thumb index notch 1 preferably upon the edge of the cover or first page of the railway guide, by means of which notch the guide may be opened immediately to the diagrammatic orienting page provided with a symbol in the form of a schematic map or plan and preferably constituting the central double page of the book or pamphlet forming the guide.

In the drawing the map or plan shows, by means of lines bearing the names of stations, a diagram or plan of a local railway network, the stations being arranged to substantially correspond to their geographical positions, the town of Lausanne, in this example, being taken as centre and the lines radiating from this centre representing lines of railway starting from or reaching this town, such as:

Lausanne-Morges, Lyon, Geneva-Lyons;

Lausanne-Vallorbe-Paris,

Lausanna - Yverdon - Neuchatel - Bienne-Bale.

Lake Leman steamboats, tramcars, etc.

At the end of, and corresponding to each line of the orienting leaf, a thumb index notch 3 is cut out in the edge of the pages of the railway-guide to enable the guide to be opened at the page upon which are printed the time tables and the information concerning the railway-traffic upon the corresponding main and secondary lines represented by the said lines of the diagram.

The orienting leaf is not limited to serving as an index for the railway-lines but may be also completed with reference lines the ends of which terminate at corresponding thumb index notches, so that all the information it may include may be found out from the railway-guide by means of this device.

It is obvious that the actual presence of the radiating arrows, as shown, is not essential for the complete expression of the invention in its broader aspects, since the substantial surrounding, bounding, or including of the central space on the leaf by the symbols and thumb notches directs the initial diffuse attention of the user of the guide inwardly from any one of the margins to a substantially central focal point which it is not necessary that it should be precisely defined, from which point the user's attention is capable of being oriented along imaginary radial lines, with equal facility in all directions, to each of the symbols, in the act of selecting the one desired.

Having now particularly described and ascertained the nature of my said invention and in what manner the same is to be performed, I declare that what I claim is:—

1. A railway guide comprising a number of pages, a double page provided with a schematic map bearing indicants representing various stations arranged to substantially correspond to their geographical positions and also provided with a number of lines indicative of railway communication lines radiating from at least one station indicant and passing through some of the other station indicants and branching from the remaining station indicants, the remaining pages showing data of the various railway lines, the outer end of each line pointing towards the edge of the double page and the edges of the pages being thumb-notched at the end of each line as far as the corresponding data page.

2. A railway guide comprising a book containing a number of pages, a central double page provided with a schematic map bearing indicants representing various stations arranged to substantially correspond to their geographical positions and also provided with a number of lines indicative of railway communication lines radiating from at least one station indicant and passing through some of the other station indicants and branching from the remaining station indicants, the remaining pages showing data of the various railway lines, the outer end of each line pointing towards the edge of the double page and the edges of the pages being thumb-notched at the end of each line as far as the corresponding data page, the pages preceding said double page being further thumb-notched as far as the far side of the double page, and the front face of the front page being provided with a marking leading to said last mentioned thumb-notch.

3. A guide comprising a number of pages including an orienting index page provided with a schematic plan showing various symbols arranged substantially to correspond to directional positions of the things for which these symbols stand, and also provided with a number of lines indicative of directions rediating from a focal position on said page and leading to the symbols, the outer end of each line pointing toward the edge of the orienting page, and the edges of the pages being thumb-notched at the end of each line depthwise to different pages.

4. A guide comprising a plurality of pages, a central index page marginally provided with informative matter, a master notch cut through the outside page and extending depthwise to the central index page, the latter being provided with peripheral notches identified with the said informative index matter and extending depthwise to different pages, and informative data on said pages related to the informative index matter with which the respective notches are identified.

5. A guide comprising a book having a plurality of pages including a central double index page, the latter having a series of notches around all four sides, enclosing an orienting area on said double page, in which area is placed informative index matter identified with the several notches, said guide including sections of pages on which is informative data related to the respective subjects of said informative index matter, said notches extending to the depths of said respective sections.

In testimony whereof I have signed my name to this specification.

GODEFROY RODOLPHE LUGINBUHL.